US012530220B2

(12) United States Patent
Milburn et al.

(10) Patent No.: US 12,530,220 B2
(45) Date of Patent: *Jan. 20, 2026

(54) SYSTEMS AND METHODS FOR STALLING UPSTREAM COMPONENT

(71) Applicant: Dover Microsystems, Inc., Wayland, MA (US)

(72) Inventors: Steven Milburn, Cranston, RI (US); Gregory T. Sullivan, Rockport, MA (US)

(73) Assignee: Dover Microsystems, Inc., Wayland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,670

(22) Filed: Dec. 15, 2023

(65) Prior Publication Data
US 2024/0345869 A1 Oct. 17, 2024

Related U.S. Application Data

(63) Continuation of application No. 17/880,539, filed on Aug. 3, 2022, now Pat. No. 11,875,180, which is a continuation of application No. 17/308,868, filed on May 5, 2021, now abandoned, which is a continuation-in-part of application No.
(Continued)

(51) Int. Cl.
*G06F 1/324* (2019.01)
*G06F 9/30* (2018.01)
*G06F 9/48* (2006.01)
*G06F 11/34* (2006.01)
*G06F 13/24* (2006.01)
(Continued)

(52) U.S. Cl.
CPC ........ *G06F 9/4812* (2013.01); *G06F 9/30043* (2013.01); *G06F 9/3013* (2013.01); *G06F 13/24* (2013.01); *G06F 21/75* (2013.01)

(58) Field of Classification Search
None
See application file for complete search history.

(56) References Cited

U.S. PATENT DOCUMENTS 5,201,056 A 4/1993 Daniel et al.
5,377,336 A 12/1994 Eickemeyer et al.
(Continued)

FOREIGN PATENT DOCUMENTS

CN 101558388 A 10/2009
CN 102160033 A 8/2011
(Continued)

OTHER PUBLICATIONS

U.S. Appl. No. 17/908,879, filed Sep. 1, 2022, Milburn et al.
(Continued)

*Primary Examiner* — Hyun Nam
(74) *Attorney, Agent, or Firm* — Wolf, Greenfield & Sacks, P.C.

(57) ABSTRACT

Systems and methods for stalling a host processor. In some embodiments, the host processor may be caused to initiate one or more selected transactions, wherein the one or more selected transactions comprise a bus transaction. The host processor may be prevented from completing the one or more selected transactions, to thereby stall the host processor.

20 Claims, 8 Drawing Sheets

Related U.S. Application Data

PCT/US2019/060030, filed on Nov. 6, 2019, and a continuation-in-part of application No. PCT/US2019/060028, filed on Nov. 6, 2019.

(60) Provisional application No. 62/756,465, filed on Nov. 6, 2018.

(51) Int. Cl.
*G06F 21/60* (2013.01)
*G06F 21/75* (2013.01)

(56) References Cited

U.S. PATENT DOCUMENTS

| | | |
|---|---|---|
| 5,488,730 A | 1/1996 | Brown, III et al. |
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |
| 5,664,223 A | 9/1997 | Bender et al. |
| 5,684,977 A | 11/1997 | Van Loo et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,622,182 B1 | 9/2003 | Miller et al. |
| 6,625,146 B1 | 9/2003 | Merchant et al. |
| 6,636,523 B1 | 10/2003 | Lau et al. |
| 6,748,589 B1 | 6/2004 | Johnson et al. |
| 6,922,740 B2 | 7/2005 | Kondratiev et al. |
| 6,976,147 B1 | 12/2005 | Isaac et al. |
| 7,047,394 B1 | 5/2006 | Van Dyke et al. |
| 7,058,918 B2 | 6/2006 | Abramovici et al. |
| 7,095,783 B1 | 8/2006 | Sotheran et al. |
| 7,137,086 B2 | 11/2006 | Abramovici |
| 7,146,548 B1 | 12/2006 | Abramovici |
| 7,213,247 B1 | 5/2007 | Wilner et al. |
| 7,263,572 B2 | 8/2007 | Hiji |
| 7,296,201 B2 | 11/2007 | Abramovici |
| 7,301,541 B2 | 11/2007 | Hansen et al. |
| 7,305,635 B1 | 12/2007 | Abramovici et al. |
| 7,313,820 B2 | 12/2007 | Kilroy |
| 7,340,469 B1 | 3/2008 | Alghathbar et al. |
| 7,348,796 B2 | 3/2008 | Crouch et al. |
| 7,426,705 B1 | 9/2008 | Kolaric |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,493,247 B2 | 2/2009 | Memmi |
| 7,493,434 B1 | 2/2009 | Abramovici |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,698,402 B2 | 4/2010 | Santos et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates, Jr. et al. |
| 8,127,121 B2 | 2/2012 | Yates, Jr. et al. |
| 8,131,663 B1 | 3/2012 | Taylor |
| 8,131,762 B2 | 3/2012 | Smetters et al. |
| 8,166,404 B2 | 4/2012 | Grinstein |
| 8,181,219 B2 | 5/2012 | Golan et al. |
| 8,271,447 B1 | 9/2012 | Natanzon et al. |
| 8,326,774 B2 | 12/2012 | Candelore |
| 8,335,754 B2 | 12/2012 | Dawson et al. |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Döring |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates, Jr. et al. |
| 8,826,391 B2 | 9/2014 | Tkacik et al. |
| 8,843,734 B2 | 9/2014 | Lim |
| 8,874,850 B1 | 10/2014 | Goodson et al. |
| 8,875,170 B1 | 10/2014 | Daniel |
| 8,887,230 B2 | 11/2014 | Barton et al. |
| 8,904,477 B2 | 12/2014 | Barton et al. |
| 8,938,783 B2 | 1/2015 | Becker et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,146,892 B2 * | 9/2015 | Lindsay ............... G06F 1/3278 |
| 9,165,078 B2 | 10/2015 | Bester et al. |
| 9,208,082 B1 | 12/2015 | Cheriton et al. |
| 9,219,752 B2 | 12/2015 | Balinksy et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,589 B2 | 11/2016 | Rao et al. |
| 9,507,598 B1 | 11/2016 | Bonnano et al. |
| 9,513,884 B2 | 12/2016 | Bates et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,736 B2 | 6/2017 | Kamboh |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | DeHon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 10,073,977 B2 | 9/2018 | Pappachan et al. |
| 10,078,763 B2 | 9/2018 | Chiricescu et al. |
| 10,114,958 B2 | 10/2018 | Sell |
| 10,133,866 B1 | 11/2018 | Kumar et al. |
| 10,152,330 B2 | 12/2018 | Chiricescu et al. |
| 10,235,176 B2 | 3/2019 | DeHon et al. |
| 10,261,794 B2 | 4/2019 | DeHon |
| 10,424,043 B1 | 9/2019 | Koston et al. |
| 10,503,904 B1 | 12/2019 | Singh et al. |
| 10,521,230 B2 | 12/2019 | DeHon |
| 10,545,760 B2 | 1/2020 | DeHon |
| 10,642,616 B2 | 5/2020 | DeHon et al. |
| 10,642,753 B2 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |
| 10,936,713 B2 | 3/2021 | DeHon et al. |
| 11,150,910 B2 | 10/2021 | Milburn et al. |
| 11,182,162 B2 | 11/2021 | DeHon et al. |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 11,635,960 B2 | 4/2023 | DeHon |
| 11,709,680 B2 | 7/2023 | Milburn et al. |

(56) References Cited

U.S. PATENT DOCUMENTS

| | | |
|---|---|---|
| 11,720,361 B2 | 8/2023 | DeHon et al. |
| 11,748,457 B2 | 9/2023 | Boling et al. |
| 11,782,714 B2 | 10/2023 | DeHon |
| 11,797,398 B2 | 10/2023 | Sutherland et al. |
| 11,841,956 B2 | 12/2023 | Sullivan et al. |
| 11,875,180 B2 * | 1/2024 | Milburn ............... G06F 21/554 |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |
| 2003/0172109 A1 | 9/2003 | Dalton et al. |
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0149719 A1 | 7/2005 | Kilroy |
| 2005/0154838 A1 | 7/2005 | DeWitt et al. |
| 2005/0182667 A1 | 8/2005 | Metzger et al. |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0242332 A1 | 10/2006 | Johnsen et al. |
| 2006/0277392 A1 | 12/2006 | Bittner, Jr. |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 | 10/2007 | Reeves et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0172027 A1 * | 7/2008 | Blomquist ............. G16H 20/17 604/500 |
| 2008/0201333 A1 | 8/2008 | Rowley |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 | 6/2009 | Samudrala et al. |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2009/0271583 A1 | 10/2009 | Kershaw et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332456 A1 | 12/2010 | Prahlad et al. |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0255018 A1 | 10/2012 | Sallam |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0312099 A1 | 11/2013 | Edwards et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |

(56) References Cited

U.S. PATENT DOCUMENTS

| | | |
|---|---|---|
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0351022 A1* | 12/2016 | Ghafoor ................. G07F 9/026 |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0168898 A1* | 6/2017 | Zbiciak ............... G06F 11/1405 |
| 2017/0177367 A1 | 6/2017 | DeHon |
| 2017/0177368 A1 | 6/2017 | DeHon et al. |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1 | 10/2017 | DeHon et al. |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0082055 A1 | 3/2018 | Fleming et al. |
| 2018/0121650 A1 | 5/2018 | Brown |
| 2018/0143890 A1 | 5/2018 | Ogawa et al. |
| 2018/0189062 A1 | 7/2018 | Baghsorkhi et al. |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0114619 A1* | 4/2019 | Wilson ............... G01R 31/3648 |
| 2019/0141059 A1 | 5/2019 | Shimizu et al. |
| 2019/0155606 A1 | 5/2019 | Rotem et al. |
| 2019/0171457 A1 | 6/2019 | DeHon et al. |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1 | 8/2019 | Milburn et al. |
| 2019/0243768 A1 | 8/2019 | Doshi et al. |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0065134 A1* | 2/2020 | Iyer ..................... G06F 12/1009 |
| 2020/0073835 A1* | 3/2020 | Golla ..................... G06F 13/24 |
| 2020/0089500 A1 | 3/2020 | DeHon |
| 2020/0125502 A1 | 4/2020 | Durham et al. |
| 2020/0201576 A1 | 6/2020 | Yudanov et al. |
| 2020/0201808 A1 | 6/2020 | Graif et al. |
| 2020/0387374 A1 | 12/2020 | DeHon |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0233579 A1 | 7/2021 | Aquil et al. |
| 2021/0255890 A1* | 8/2021 | Milburn .................. G06F 21/75 |
| 2021/0406028 A1 | 12/2021 | Boling et al. |
| 2021/0406137 A1 | 12/2021 | Sutherland et al. |
| 2022/0012329 A1 | 1/2022 | Boling et al. |
| 2022/0043654 A1 | 2/2022 | DeHon et al. |
| 2022/0050904 A1 | 2/2022 | Sullivan et al. |
| 2022/0092173 A1 | 3/2022 | Sutherland et al. |
| 2022/0129343 A1 | 4/2022 | Milburn et al. |
| 2022/0198014 A1 | 6/2022 | Boling et al. |
| 2022/0300583 A1 | 9/2022 | Boling et al. |
| 2022/0309134 A1 | 9/2022 | Boling et al. |
| 2022/0374415 A1 | 11/2022 | Boling et al. |
| 2022/0398312 A1 | 12/2022 | Sutherland et al. |
| 2023/0054942 A1* | 2/2023 | Milburn .................. G06F 21/75 |
| 2024/0345869 A1* | 10/2024 | Milburn ............... G06F 21/121 |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A2 | 6/2017 |
| WO | WO 2017/106103 A1 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

International Search Report and Written Opinion for International Application No. PCT/US2019/016272 mailed Apr. 8, 2019.
International Preliminary Report on Patentability for International Application No. PCT/US2019/016272 mailed Aug. 13, 2020.
International Search Report and Written Opinion for International Application No. PCT/US2019/016276 mailed Apr. 26, 2019.
International Preliminary Report on Patentability for International Application No. PCT/US2019/016276 mailed Aug. 13, 2020.
International Search Report and Written Opinion for International Application No. PCT/US2019/029880 mailed Aug. 8, 2019.

(56) References Cited

OTHER PUBLICATIONS

International Preliminary Report on Patentability for International Application No. PCT/US2019/029880 mailed Nov. 12, 2020.
International Search Report and Written Opinion for International Application No. PCT/US2019/016317 mailed Apr. 16, 2019.
International Preliminary Report on Patentability for International Application No. PCT/US2019/016317 mailed Aug. 13, 2020.
International Search Report and Written Opinion for International Application No. PCT/US2020/059057 mailed Feb. 8, 2021.
International Preliminary Report on Patentability for International Application No. PCT/US2020/059057, mailed May 19, 2022.
International Search Report and Written Opinion for International Application No. PCT/US2016/066188 mailed Jul. 13, 2017.
International Search Report and Written Opinion for International Application No. PCT/US2016/066194 mailed Apr. 7, 2017.
International Search Report and Written Opinion for International Application No. PCT/US2019/016242 mailed Mar. 29, 2019.
International Search Report and Written Opinion for International Application No. PCT/US2019/060030 mailed Mar. 19, 2020.
International Search Report and Written Opinion for International Application No. PCT/US2019/060698 mailed Feb. 3, 2020.
International Search Report and Written Opinion for International Application No. PCT/US2019/067084 mailed Mar. 19, 2020.
Invitation to Pay Additional Fees for International Application No. PCT/US2019/013678 mailed Apr. 15, 2020.
International Search Report and Written Opinion for International Application No. PCT/US2019/013678 mailed Jun. 23, 2020.
Invitation to Pay Additional Fees for International Application No. PCT/US2019/016295 mailed May 3, 2019.
International Search Report and Written Opinion for International Application No. PCT/US2019/016295 mailed Jun. 26, 2019.
International Preliminary Report on Patentability for International Application No. PCT/US2019/016295 mailed Aug. 13, 2020.
International Search Report and Written Opinion for International Application No. PCT/US2021/020602 mailed May 11, 2021.
International Preliminary Report on Patentability for International Application No. PCT/US2021/020602, mailed Sep. 15, 2022.
International Search Report and Written Opinion for International Application No. PCT/US2020/055952 mailed Jan. 28, 2021.
International Preliminary Report on Patentability for International Application No. PCT/US2020/055952 mailed Apr. 28, 2022.
International Search Report and Written Opinion for International Application No. PCT/US2019/060028 mailed Mar. 23, 2020.
International Preliminary Report on Patentability for International Application No. PCT/US2019/060028 mailed May 20, 2021.
International Search Report and Written Opinion for International Application No. PCT/US2022/042492 mailed Jan. 11, 2023.
[No Author Listed] Arm Limited: Amba® Axi™ and Ace™ Protocol Specification. Oct. 28, 2011:1-306. [https://capocaccia.ethz.ch/capo/raw-attachment/wiki/2014/microblaze14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 2, 20156. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the 34$^{th}$ Annual International Symposium In Computer Architecture. Jun. 9, 2007;35(2):482-93.
Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.
Dehon et al., Dover A Metadata-Extended RISC-V. Jan. 6, 2016:34. [https://web.archive.org/web/20160331131339 if /http://riscv.org/wp-content/uploads/2016/01/Wed1430-dover riscv jan2016 v3.pdf].
Dehon et al., Dover: A metadata-extended RISC-V. RISC-V Workshop Oracle Conference Center, Redwood Shores, CA. Jan. 6, 2016. 33 pages.
Dhawan et al., Architectural support for software-defined metadata processing. Proceedings of the Twentieth International Conference on Architectural Support for Programming Languages and Operating Systems (ASPLOS). Mar. 14, 2015:487-502.
Dhawan et al., Area-efficient near-associative memories on FPGAs. ACM Transactions on Reconfigurable Technology and Systems (TRETS). Jan. 23, 2015;7(4):1-22.
Dhawan et al., PUMP: a programmable unit for metadata processing. Proceedings of the Third Workshop on Hardware and Architectural Support for Security and Privacy (HASP). Jun. 15, 2014:1-8.
Engelke et al., Efficient LLVM-Based Dynamic Binary Translation. ACM VEE. Apr. 16, 2021;165-71.
Evans et al., Melding security metadata between software and hardware. Proceedings of the Posters and Demo Track Dec. 3, 2012:1-2.
Geater, Tee requirements for ISA. Thales eSecurity. 2018. 21 pages.
Hrițcu, Micro-policies: Formally verified, tag-based security monitors. Proceedings of the 10th ACM Workshop on Programming Languages and Analysis for Security Jul. 4, 2015.
Hunt et al., The Seven Properties of Highly Secure Devices. 2021. 10 pages.
Juglaret et al., Towards a fully abstract compiler using Micro-Policies: Secure compilation for mutually distrustful components. arXiv preprint arXiv:1510.00697. Oct. 2, 2015. 31 pages.
Kane, Runtime Monitoring for Safety-Critical Embedded Systems. Carnegie Mellon University. Feb. 2015;207 pages.
Kannan et al., Decoupling dynamic information flow tracking with a dedicated coprocessor. 2009 IEEE/IFIP International Conference on Dependable Systems & Networks. Jun. 29, 2009:105-14.
Mambretti et al., Trellis: Privilege separation for multi-user applications made easy. International Symposium on Research in Attacks, Intrusions, and Defenses. Springer, Cham. Sep. 16, 2016:437-56.
Mutlu, 18-447 Computer Architecture Lecture 11: Precise Exceptions, State Maintenance, State Recovery. Carnegie Mellon University Lecture. Feb. 11, 2015, 49 pages.
Nagarakatte et al., SoftBound: Highly Compatible and Complete Spatial Memory Safety for C. University of Pennsylvania Department of Computer and Information Science Technical Report. Jan. 2009. 12 pages.
Okhravi et al., One Giant Leap for Computer Security. IEEE Computer and Reliability Societies. Jul./Aug. 2020;18(4):8-19.
Ozsoy et al., Sift: A low-overhead dynamic information flow tracking architecture for smt processors. Proceedings of the 8th ACM International Conference on Computing Frontiers. May 3, 2011:1-11.
Roessler et al., Protecting the stack with metadata policies and tagged hardware. 2018 IEEE Symposium on Security and Privacy (SP) May 20, 2018;478-95.
Song et al., Security tagging for a zero-kernel operating system. 2013 46th Hawaii International Conference on System Sciences Jan. 7, 2013:5049-58.
Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].
Suh et al., Secure Program Execution via Dynamic Information Flow Tracking. MIT CSAIL. Jul. 2003. 14 pages.
Sullivan et al., The dover inherently secure processor. 2017 IEEE International Symposium on Technologies for Homeland Security (HST) Apr. 25, 2017:1-5.

(56) References Cited

OTHER PUBLICATIONS

Tiwari et al., A small cache of large ranges: Hardware methods for efficiently searching, storing, and updating big dataflow tags. 2008 41st IEEE/ACM International Symposium on Microarchitecture Nov. 8, 2008:94-105.
Tiwari et al., Complete information flow tracking from the gates up. InProceedings of the 14th international conference on Architectural support for programming languages and operating systems Mar. 7, 2009;109-20.
Waterman et al., The RISC-V Instruction Set Manual, vol. I: Unprivileged ISA, Document Version 20191213. RISC-V Foundation. Dec. 2019. 238 pages.
Watson et al., Cheri: A hybrid capability-system architecture for scalable software compartmentalization. 2015 IEEE Symposium on Security and Privacy Sep. 2015;20-37.
Witchel et al., Mondrian Memory Protection. ASPLOS-X. 2002;13 pages.
Woodruff, Cheri: A RISC capability machine for practical memory safety. University of Cambridge, Computer Laboratory; 2014. 112 pages.
Zeldovich et al., Hardware Enforcement of Application Security Policies Using Tagged Memory. USENIX Symposium on Operating Systems Design and Implementation. Dec. 8, 2008:8;225-40.

\* cited by examiner

SYSTEMS AND METHODS FOR STALLING UPSTREAM COMPONENT

RELATED APPLICATIONS

This application is a Continuation of U.S. application Ser. No. 17/880,539, filed Aug. 3, 2022, which is a continuation of U.S. application Ser. No. 17/308,868, filed May 5, 2021, which is a continuation-in-part of and claims priority to international application No. PCT/US2019/060030, filed on Nov. 6, 2019. This application is also a continuation-in-part of and claims priority to international application No.: PCT/US0219/060028 filed Nov. 6, 2019. Both of these applications claim the benefit of and priority to U.S. Provisional Patent Application Ser. No. 62/756,465 filed on Nov. 6, 2018. The contents of these applications are incorporated herein by reference in their entireties.

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed person data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals race to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

In accordance with some embodiments, a method is provided for stalling a host processor, the method comprising acts of: causing the host processor to initiate one or more selected transactions, wherein the one or more selected transactions comprise a bus transaction; and preventing the host processor from completing the one or more selected transactions, to thereby stall the host processor.

In accordance with some embodiments, a method is provided for stalling transactions on a first bus along a communication path between an upstream component and a downstream component, the method comprising acts of: causing the upstream component to initiate a transaction on a second bus, wherein the second bus is outside the communication path between the upstream component and the downstream component; and stalling the transaction on the second bus to thereby stall the upstream component.

In accordance with some embodiments, a method is provided for stalling a host processor, the method comprising acts of: causing the host processor to initiate one or more selected transactions, wherein the one or more selected transactions comprise a data bus transaction; and preventing the host processor from completing the data bus transaction, to thereby stall the host processor, wherein: the act of causing the host processor to initiate one or more selected transactions comprises asserting an interrupt to cause the host processor to load, from an interrupt vector address, one or more instructions of an interrupt handler corresponding to the interrupt; the one or more instructions, when executed by the host processor, cause the host processor to check for a cause of the interrupt; and the act of preventing the host processor from completing the data bus transaction comprises preventing the host processor from checking for a cause of the interrupt.

In accordance with some embodiments, a method is provided for stalling a host processor, the method comprising acts of: causing the host processor to initiate one or more selected transactions, wherein the one or more selected transactions comprise a data bus transaction; and preventing the host processor from completing the data bus transaction, to thereby stall the host processor, wherein: the act of causing the host processor to initiate one or more selected transactions comprises asserting an interrupt to cause the host processor to load, from an interrupt vector address, one or more instructions of an interrupt handler corresponding to the interrupt; the one or more instructions, when executed by the host processor, cause the host processor to access a selected register; and the act of preventing the host processor from completing the data bus transaction comprises preventing the host processor from accessing the selected register.

In accordance with some embodiments, a system is provided, comprising circuitry and/or one or more processors programmed by executable instructions, wherein the circuitry and/or the one or more programmed processors are configured to perform any of the methods described herein.

In accordance with some embodiments, at least one computer-readable medium is provided, having stored thereon at least one netlist for any of the circuitries described herein.

In accordance with some embodiments, at least one computer-readable medium is provided, having stored thereon at least one hardware description that, when synthesized, produces any of the netlists described herein.

In accordance with some embodiments, at least one computer-readable medium is provided, having stored thereon any of the executable instructions described herein.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

Figure 1:
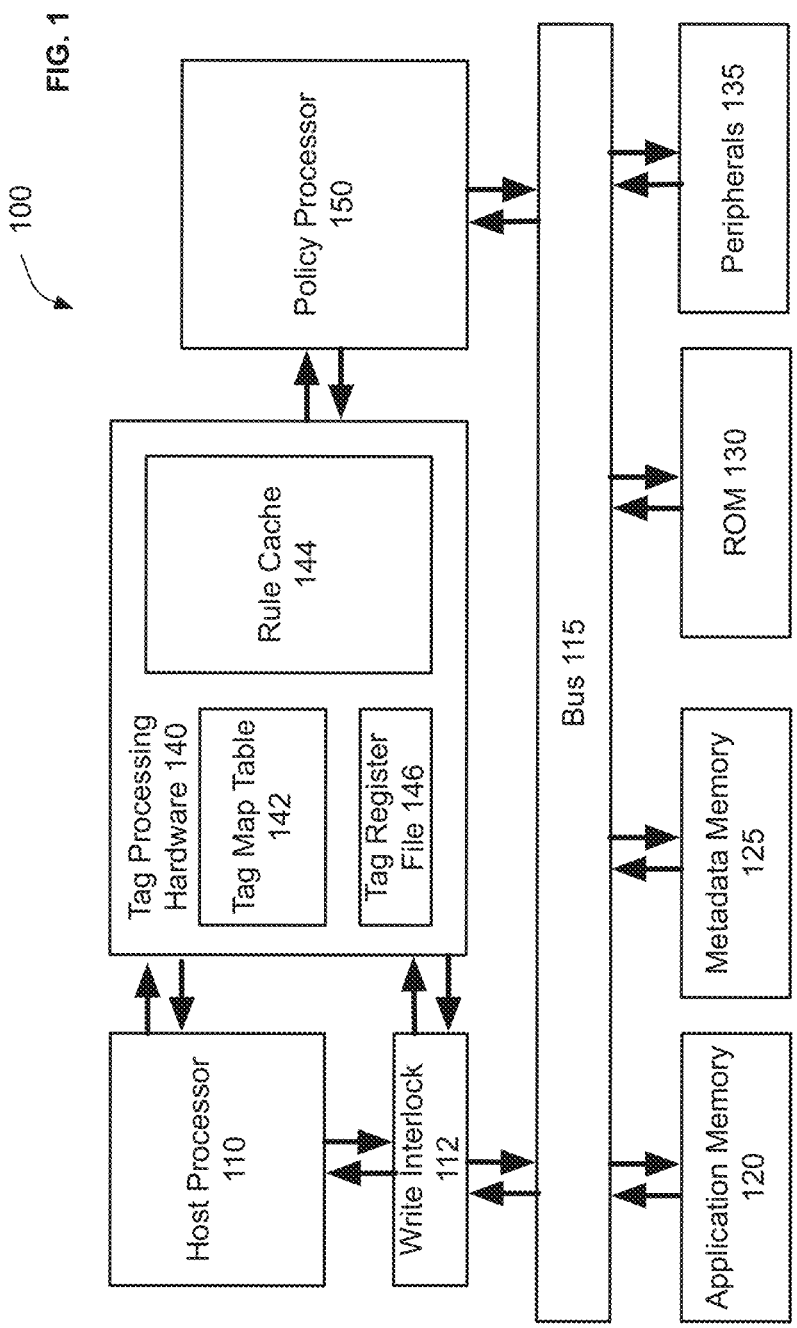
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data is referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map address X in the application memory 120 to address Y in the metadata memory 125. A value stored at the address Y is sometimes referred to herein as a "metadata tag" or simply a "tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags" or simply "tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata symbol "RED" may be stored at the metadata memory address Z. By storing the metadata memory address Z in the metadata memory address Y, the application data stored at the application memory address X may be tagged "RED."

In this manner, the binary representation of the metadata symbol "RED" may be stored only once in the metadata memory 120. For instance, if application data stored at another application memory address X' is also to be tagged "RED," the tag map table 142 may map the application memory address X' to a metadata memory address Y' where the metadata memory address Z is also stored.

Moreover, in this manner, tag update may be simplified. For instance, if the application data stored at the application memory address X is to be tagged "BLUE" at a subsequent time, a metadata memory address Z' may be written at the metadata memory address Y, to replace the metadata memory address Z, and a binary representation of the metadata symbol "BLUE" may be stored at the metadata memory address Z'.

Thus, the inventors have recognized and appreciated that a chain of metadata memory addresses of any suitable length N may be used for tagging, including N=0 (e.g., where a binary representation of a metadata symbol is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single tag, so that all words in that region are associated with the same metadata. This may advantageously reduce a size of the tag map table 142 and/or the metadata memory 125. For example, a single tag may be maintained for an entire address range, as opposed to maintaining multiple tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction should be allowed. For instance, the host processor 110 may fetch and execute an instruction, and may queue a result of executing the instruction into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive read instructions may be queued in addition to, or instead of, write instructions. For instance, subsequent instructions attempting to access a target address of a destructive read instruction may be queued in a memory region that is not cached. If and when it is determined that the destructive read instruction should be allowed, the queued instructions may be loaded for execution.

In some embodiments, a destructive read instruction may be allowed to proceed, and data read from a target address may be captured in a buffer. If and when it is determined that the destructive read instruction should be allowed, the data captured in the buffer may be discarded. If and when it is determined that the destructive read instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding tag. Additionally, or alternatively, for a register identifier received from the host processor 110, the tag processing hardware 140 may access a tag from a tag register file 146 within the tag processing hardware 140.

In some embodiments, if an application memory address does not have a corresponding entry in the tag map table 142, the tag processing hardware 140 may send a query to a policy processor 150. The query may include the application memory address in question, and the policy processor 150 may return a tag for that application memory address. Additionally, or alternatively, the policy processor 150 may create a new tag map entry for an address range including the application memory address. In this manner, the appropriate tag may be made available, for future reference, in the tag map table 142 in association with the application memory address in question.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a tag for a program counter, a tag for an application memory address from which the instruction is fetched (e.g., a word in memory to which the program counter points), a tag for a register in which an operand of the instruction is stored, and/or a tag for an application memory address referenced by the instruction. In one example, the instruction may be a load instruction, and an operand of the instruction may be an application memory address from which application data is to be loaded. The query may include, among other things, a tag for a register in which the application memory address is stored, as well as a tag for the application memory address itself. In another example, the instruction may be an arithmetic instruction, and there may be two operands. The query may include, among other things, a first tag for a first register in which a first operand is stored, and a second tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction in question should be allowed. For instance, the tag processing hardware 140 may send an interrupt signal to the policy processor 150, along with one or more inputs relating to the instruction in question (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input tags) to determine if an instruction in question should be allowed. If the instruction is not to be allowed, the policy processor 150 may so notify the tag processing hardware 140. If the instruction is to be allowed, the policy processor 150 may compute one or more outputs (e.g., one or more output tags) to be returned to the tag processing hardware 140. As one example, the instruction may be a store instruction, and the policy processor 150 may compute an output tag for an application memory address to which application data is to be stored. As another example, the instruction may be an arithmetic instruction, and the policy processor 150 may compute an output tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule cache 144 for mapping one or more inputs to a decision and/or one or more outputs. For instance, a query into the rule cache 144 may be similarly constructed as a query to the policy processor 150 to check if an instruction executed by the host processor 110 should be allowed. If there is a cache hit, the rule cache 144 may output a decision as to whether to the instruction should be allowed, and/or one or more output tags (e.g., as described above in connection with the policy processor 150). Such a mapping in the rule cache 144 may be created using a query response from the policy processor 150. However, that is not required, as in some embodiments, one or more mappings may be installed into the rule cache 144 ahead of time.

In some embodiments, the rule cache 144 may be used to provide a performance enhancement. For instance, before querying the policy processor 150 with one or more input tags, the tag processing hardware 140 may first query the rule cache 144 with the one or more input tags. In case of a cache hit, the tag processing hardware 140 may proceed with a decision and/or one or more output tags from the rule cache 144, without querying the policy processor 150. This may provide a significant speedup. In case of a cache miss, the tag processing hardware 140 may query the policy processor 150 and install a response from the policy processor 150 into the rule cache 144 for potential future use.

In some embodiments, if the tag processing hardware 140 determines that an instruction in question should be allowed (e.g., based on a hit in the rule cache 144, or a miss in the rule cache 144, followed by a response from the policy processor 150 indicating no policy violation has been found), the tag processing hardware 140 may indicate to the write interlock 112 that a result of executing the instruction may be written back to memory. Additionally, or alternatively, the tag processing hardware 140 may update the metadata memory 125, the tag map table 142, and/or the tag register file 146 with one or more output tags (e.g., as received from the rule cache 144 or the policy processor 150). As one example, for a store instruction, the metadata memory 125 may be updated via an address translation by the tag map table 142. For instance, an application memory address referenced by the store instruction may be used to look up a metadata memory address from the tag map table 142, and metadata received from the rule cache 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate tag.

In some embodiments, if the tag processing hardware 140 determines that the instruction in question represents a policy violation (e.g., based on a miss in the rule cache 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and discussed above, it should be appreciated that aspects of the present disclosure are not limited to the use of any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
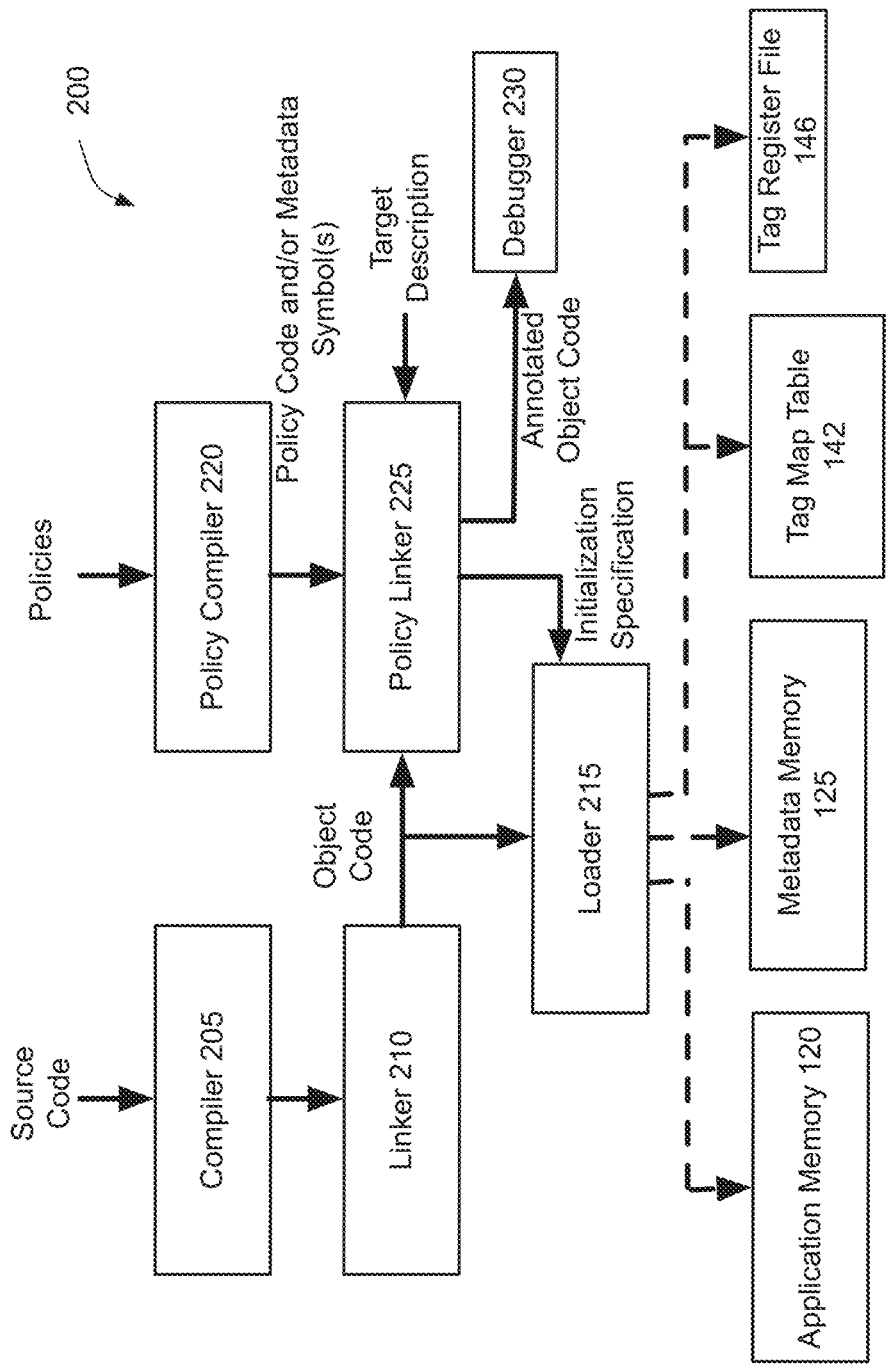
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 shown in FIG. 1.

In the example shown in FIG. 2, the software system 200 includes a software toolchain having a compiler 205, a linker 210, and a loader 215. The compiler 205 may be programmed to process source code into executable code, where the source code may be in a higher level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as "frame" locations, and as function epilogue instructions execute, the "frame" tags may be removed. The stack policy may indicate that instructions implementing a body of the function (as opposed to function prologue and function epilogue) only have read access to "frame" locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate a policy written in a policy language into policy code. For instance, the policy compiler 220 may output policy code in C or some other suitable programming language. Additionally, or alternatively, the policy compiler 220 may output one or more metadata symbols referenced by the policy. At initialization, such a metadata symbol may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, is sometimes referred to herein as a "tag."

It should be appreciated that aspects of the present disclosure are not limited to resolving metadata symbols at load time. In some embodiments, one or more metadata symbols may be resolved statically (e.g., at compile time or link time). For example, the policy compiler 220 may process one or more applicable policies, and resolve one or more metadata symbols defined by the one or more policies into a statically defined binary representation. Additionally, or alternatively, the policy linker 225 may resolve one or more metadata symbols into a statically defined binary representation, or a pointer to a data structure storing a statically defined binary representation. The inventors have recognized and appreciated that resolving metadata symbols statically may advantageously reduce load time processing. However, aspects of the present disclosure are not limited to resolving metadata symbols in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 shown in FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata symbols, and the policy linker 225 may search the target description to identify entities having those entity names. The policy linker 225 may identify descriptions of those entities from the target description, and use the descriptions to annotate, with appropriate metadata symbols, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description entity descriptions with no corresponding "init" statement.

In some embodiments, the loader 215 may initialize a target system based on an initialization specification produced by the policy linker 225. For instance, with reference to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

Figure 6:
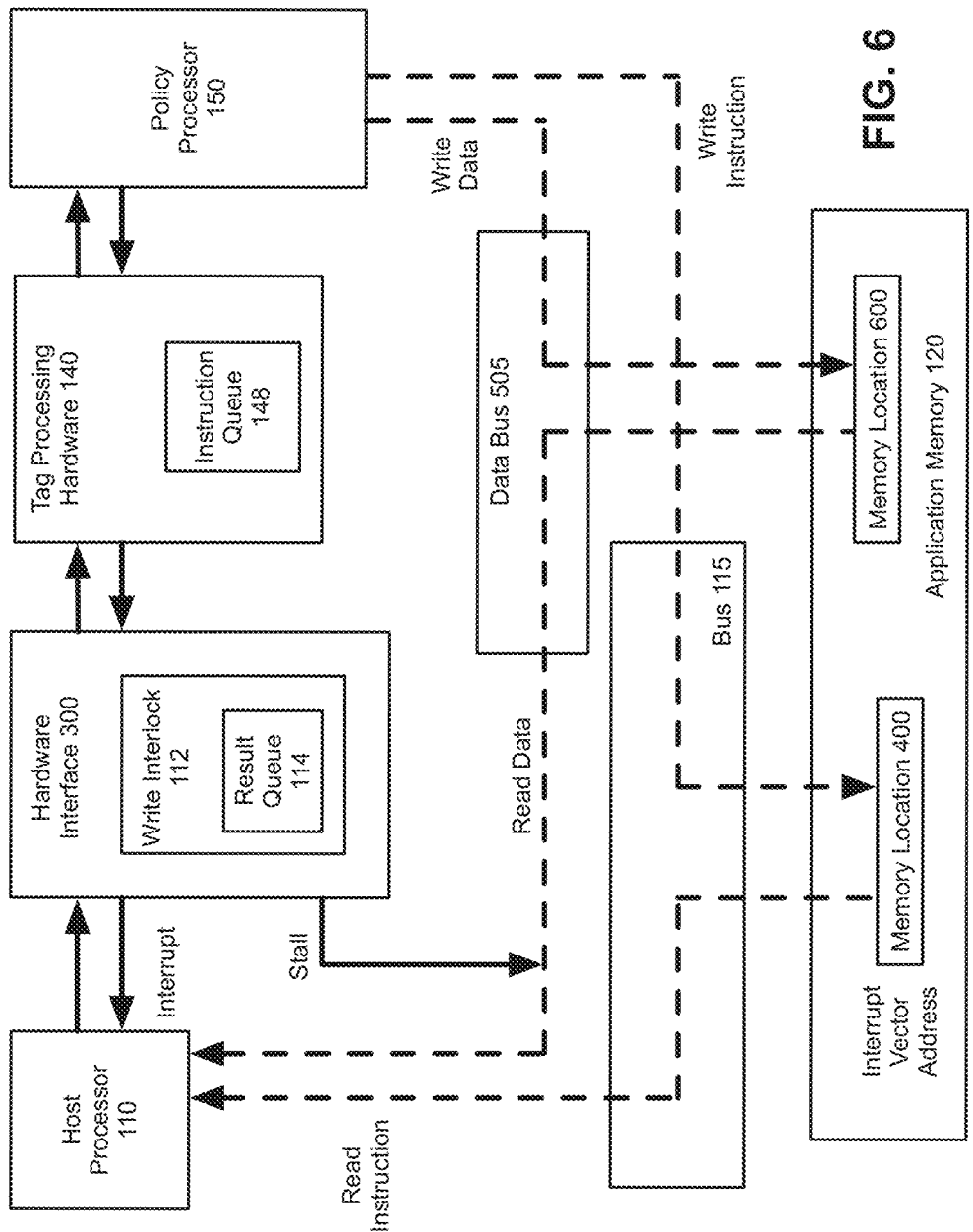
FIG. 6 shows an illustrative application memory location 600, in accordance with some embodiments.

In some embodiments, the policy linker 225 and/or the loader 215 may maintain a mapping of binary representations of metadata back to metadata labels. Such a mapping may be used, for example, by a debugger 230. For instance, in some embodiments, the debugger 230 may be provided to display a human readable version of an initialization specification, which may list one or more entities and, for each entity, a set of one or more metadata labels associated with the entity. Additionally, or alternatively, the debugger 230 may be programmed to display assembly code annotated with metadata labels, such as assembly code generated by disassembling object code annotated with metadata labels. An example of such assembly code is shown in FIG. 6 and discussed below. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

With reference again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as discussed above, the illustrative rule cache 144 in the example of FIG. 1 may map input tags to output tags, and, in some embodiments, the input tags may be metadata memory addresses where binary representations of metadata are stored, as opposed to the binary representations themselves. The inventors have recognized and appreciated that if a same binary representation of metadata is stored at two different metadata memory addresses X and Y, the rule cache 144 may not "recognize" the metadata memory address Y even if the rule cache 144 already stores a mapping for the metadata memory address X. This may result in a large number of unnecessary rule cache misses, which degrades system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the metadata memory 125), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150). If the binary representation of metadata has already been stored, a reference to the existing storage location may be used (e.g., installed in the illustrative rule cache 144).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to the use of a hash table for keeping track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

For instance, while examples are discussed herein that include a compiler (e.g., the illustrative compiler 205 and/or the illustrative policy compiler 220 in the example of FIG. 2), it should be appreciated that aspects of the present disclosure are not so limited. In some embodiments, a software toolchain may be implemented as an interpreter. For example, a lazy initialization scheme may be implemented, where one or more default symbols (e.g., "UNINITIALIZED") may be used for tagging at startup, and a policy processor (e.g., the illustrative policy processor 150 in the example of FIG. 1) may evaluate one or more policies and resolve the one or more default symbols in a just-in-time manner.

In a System-on-Chip (SoC), a downstream component that directly or indirectly consumes outputs produced by an upstream component may sometimes be unable to keep up with the upstream component (e.g., because the downstream component has limited resources). In some instances, a bus along a communication path between the upstream component and the downstream component may provide a native mechanism for sending a stall signal to indicate that the downstream component is not ready to accept more of the upstream component's outputs. This may cause the upstream component to stop producing outputs. When the downstream component is caught up, the stall signal may be de-asserted, and the upstream component may resume.

The inventors have recognized and appreciated that, in some instances, a communication path between an upstream component and a downstream component may not include a bus that provides a native mechanism for sending a stall signal upstream. Accordingly, in some embodiments, techniques are provided for sending a stall signal to the upstream component via a bus that is outside the communication path between an upstream component and a downstream component. For instance, the bus that is outside the communication path between the upstream component and the downstream component may have a relatively low transaction frequency, and techniques are provided to induce a transaction on that bus, so that the induced transaction may be stalled, thereby stalling the upstream component.

In some embodiments, an upstream component may include a host processor (e.g., the illustrative host processor 110 in the example of FIG. 1), and a downstream component may include tag processing hardware (e.g., the illustrative tag processing hardware 140). For instance, an instruction executed by the host processor may be checked by the tag processing hardware to determine if the instruction should be allowed. In some embodiments, the instruction may be placed in a queue of instructions to be checked by the tag processing hardware. Additionally, or alternatively, a result of executing the instruction may be placed in a queue of a write interlock (e.g., the illustrative write interlock 112) while the tag processing hardware checks the instruction. If the tag processing hardware determines that the instruction should be allowed, the result may be released from the queue of the write interlock and written into an application memory (e.g., the illustrative application memory 120).

The inventors have recognized and appreciated that, in some instances, a result queue of a write interlock and/or an instruction queue of tag processing hardware may become full. When that occurs, one or more execution results may be written into an application memory without having been checked by the tag processing hardware. This may create a security vulnerability. For instance, an attacker may cause a host processor to execute a large number of instructions in quick succession, so as to fill up the result queue and/or the instruction queue. The attacker may then cause execution of malicious code that otherwise would have been disallowed by the tag processing hardware. To avoid such an attack, it may be desirable to stall the host processor temporarily to allow the tag processing hardware to catch up.

However, the inventors have recognized and appreciated that many host processor designs assume that a host processor is a master device and therefore do not provide a mechanism for stalling the host processor. For instance, there may be no stall signal in a list of signals that are recognized by a host processor, and a bus connecting the host processor and tag processing hardware may not provide a native mechanism for sending a stall signal to the host processor. While a host processor design may be modified to add a stall signal, an SoC manufacturer may be unable to do so in practice because the host processor design may have been licensed from another company, and the license may prohibit modification. Accordingly, in some embodiments, techniques are provided for stalling a host processor using an existing interface of the host processor, such as a bus that provides a native mechanism for sending a stall signal to the host processor. This bus may, in some instances, be outside a communication path between the host processor and the tag processing hardware.

In some embodiments, stalling may be effectuated by preventing a host processor from accessing an application memory. For instance, when a result queue of a write interlock is filled to a selected threshold level, a signal may be triggered to cause a bus to stop responding to the host processor's memory access requests. Additionally, or alternatively, a similar signal may be triggered when an instruction queue of tag processing hardware is filled to a selected threshold level. In this manner, the tag processing hardware may check instructions already executed by the host processor while the host processor waits for the bus to respond.

Although starving a host processor of memory access may be a graceful way of stalling, the inventors have recognized and appreciated that it may not always be sufficient. For instance, many host processor designs include a cache that may be accessed more quickly than an application memory. A host processor with such a cache (not shown in FIG. 1) may load data from an application memory only when there is a cache miss, and may write data to the application memory only when there is a cache eviction. As a result, the host processor may be able to execute a large number of instructions without performing any memory access. For instance, the host processor may execute a loop with many iterations, where each iteration includes complex mathematical calculations involving only internal variables. If all of the internal variables fit into the cache, the host processor may go through the loop without reading from, or writing to, the application memory.

Thus, the inventors have recognized and appreciated that tag processing hardware may, in some instances, be unable to keep up with a host processor even if the host processor is prevented from accessing an application memory. Accordingly, in some embodiments, techniques are provided to cause a host processor to perform a memory access in response to detecting that tag processor hardware is falling behind. For instance, in response to detecting that a result queue of a write interlock or an instruction queue of the tag processing hardware is becoming full, a signal may be asserted to cause the host processor to perform a memory access, which may in turn be stalled.

Figure 3A:
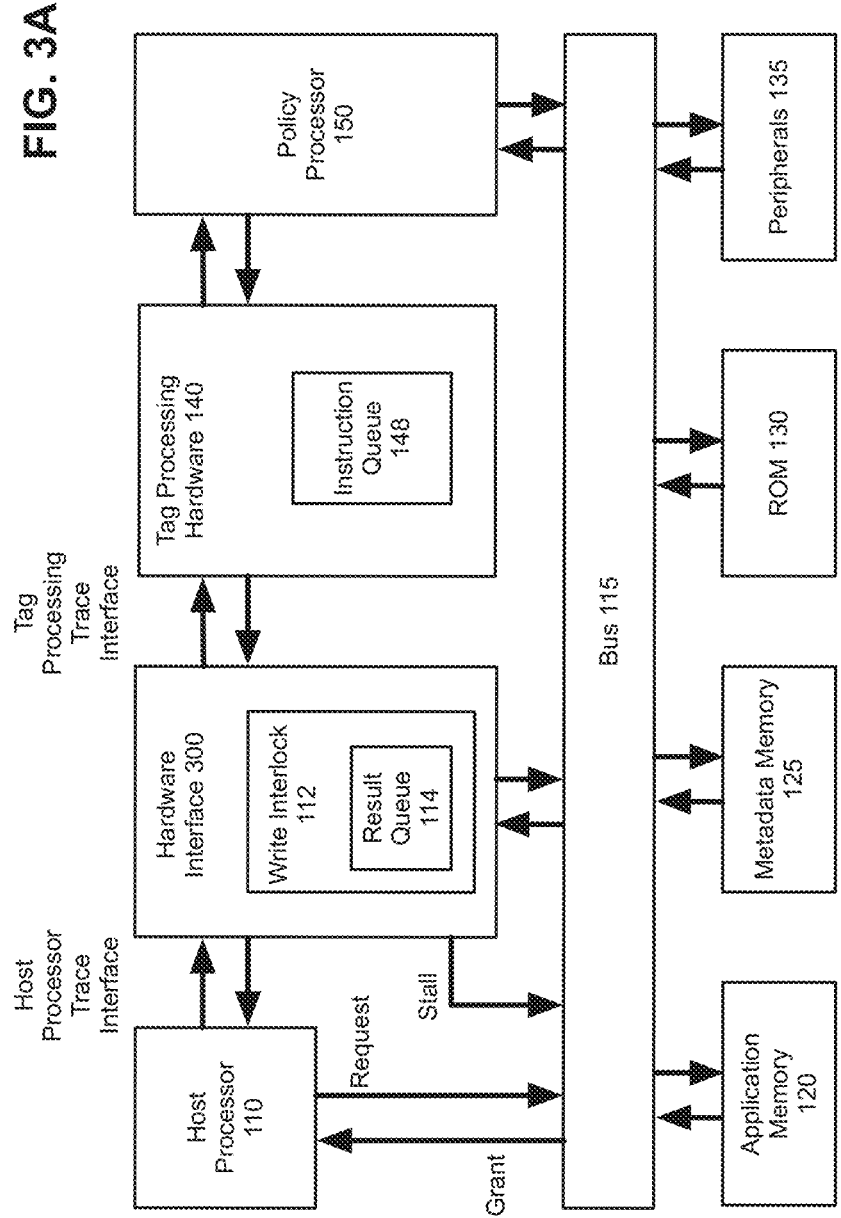
FIG. 3A shows an illustrative hardware interface 300, in accordance with some embodiments.

FIG. 3A shows an illustrative hardware interface 300, in accordance with some embodiments. The hardware interface 300 may coordinate interactions between a host processor (e.g., the illustrative host processor 110 in the example of FIG. 1) and tag processing hardware (e.g., the illustrative tag processing hardware 140 in the example of FIG. 1). For instance, the hardware interface 300 may transform an instruction in an ISA of the host processor 110 into one or more instructions in an ISA of the tag processing hardware 140. Illustrative techniques for transforming instructions are described in International Patent Application No. PCT/US2019/016276, filed on Feb. 1, 2019, entitled "SYSTEMS AND METHODS FOR TRANSFORMING INSTRUCTIONS FOR METADATA PROCESSING," which is incorporated herein by reference in its entirety. However, it should be appreciated that aspects of the present disclosure are not limited to any particular technique for instruction transformation, or to any instruction transformation at all.

In some embodiments, the host processor 110 may, via a host processor trace interface, inform the hardware interface 300 that an instruction has been executed by the host processor 110. The hardware interface 300 may in turn inform the tag processing hardware 140 via a tag processing trace interface. The tag processing hardware 140 may place a received instruction (which may or may not have been transformed by the hardware interface 300) in an instruction queue 148, which may hold instructions to be checked by the tag processing hardware 140 and/or a policy processor (e.g., the illustrative policy processor 150 in the example of FIG. 1).

In some embodiments, the hardware interface 300 may include a write interlock (e.g., the illustrative write interlock 112 shown in FIG. 1). Illustrative techniques for write interlocking are described in International Patent Application No. PCT/US2019/016317, filed on Feb. 1, 2019, entitled "SYSTEMS AND METHODS FOR POST CACHE INTERLOCKING," which is incorporated herein by reference in its entirety. However, it should be appreciated that aspects of the present disclosure are not limited to any particular technique for write interlocking, or to any write interlocking at all.

The inventors have recognized and appreciated that write interlock designs may be adapted to be compatible with different host processor designs. Therefore, it may be desirable to include the write interlock 112 as part of the hardware interface 300, so that the tag processing hardware 140 may be provided in a manner that is independent of host processor design. However, it should be appreciated that aspects of the present disclosure are not limited to any particular component, or any particular arrangement of components. In some embodiments, the write interlock 112 may be part of the tag processing hardware 140. Additionally, or alternatively, any one or more functionalities described herein in connection with the hardware interface 300 may be performed by the tag processing hardware 140.

In some embodiments, the write interlock 112 may include a result queue 114 for storing execution results while instructions that produced the results are being checked by the tag processing hardware 140 and/or the policy processor 150. If an instruction is allowed, a corresponding result may be released from the result queue 114 and written into an application memory (e.g., the illustrative application memory 120 in the example of FIG. 1).

In some embodiments, the host processor 110 may access the application memory 120 via a bus (e.g., the illustrative bus 115 in the example of FIG. 1). The bus 115 may implement any suitable protocol, such as Advanced extensible Interface (AXI). For instance, to read an instruction or a piece of data from the application memory 120, the host processor 110 may send a read request to the bus 115 with an address where the instruction or data is stored. The bus 115 may perform a handshake, for example, by asserting a VALID signal at a processor-side interface and a READY signal at a memory-side interface. When both signals are high, the address may be transmitted to the application memory 120. When the application memory 120 returns the requested instruction or data, the bus 115 may then perform another handshake, for example, by asserting a VALID signal at the memory-side interface and a READY signal at the processor-side interface. When both signals are high, the requested instruction or data may be transmitted to the host processor 110.

Additionally, or alternatively, to write an instruction or a piece of data to the application memory 120, the host processor 110 may send a write request to the bus 115 with an address where the instruction or data is to be written. The bus 115 may perform a first handshake, for example, by asserting a VALID signal at a processor-side interface and a READY signal at a memory-side interface. When both signals are high, the address may be transmitted to the application memory 120. The bus 115 may then perform a second handshake, for example, by asserting a VALID signal at the processor-side interface and a READY signal at the memory-side interface. When both signals are high, the instruction or data to be written may be transmitted to the application memory 120. When the application memory 120 responds with an acknowledgment that the instruction or data has been written at the indicated address, the bus 115 may perform a third handshake, for example, by asserting a VALID signal at the memory-side interface and a READY signal at the processor-side interface. When both signals are high, the acknowledgment may be transmitted to the host processor 110.

Figure 3B:
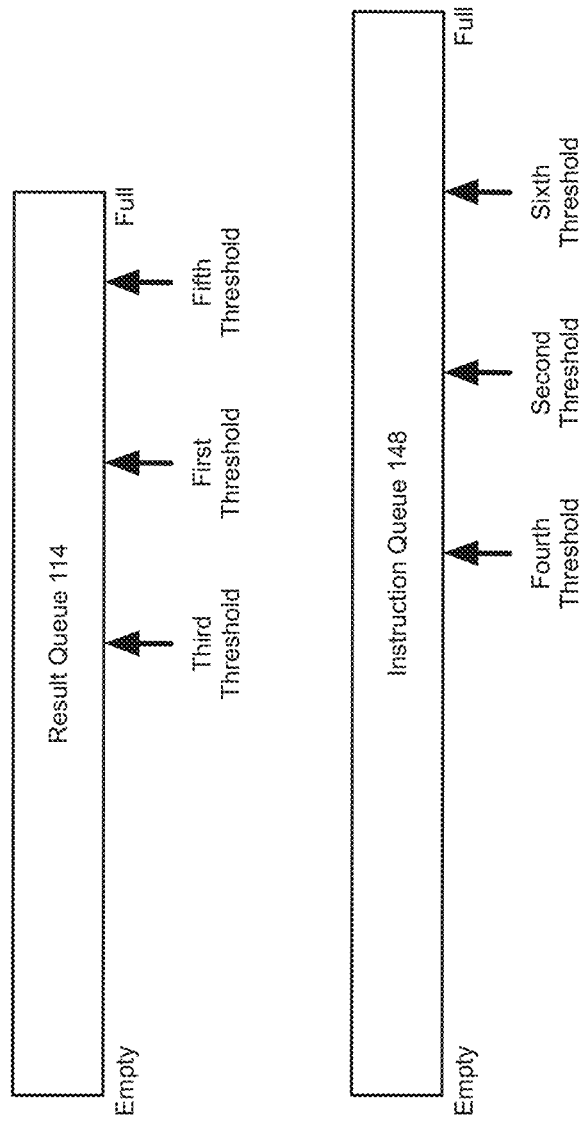
FIG. 3B shows the illustrative result queue 114 and the illustrative instruction queue 148 in the example of FIG. 3A, in accordance with some embodiments.

The inventors have recognized and appreciated that the host processor 110 may be stalled by preventing the host processor 110 from accessing the application memory 120. In some embodiments, the hardware interface 300 may determine that the tag processing hardware 140 is falling behind the host processor 110. For example, the hardware interface 300 may determine that the result queue 114 of the write interlock 112 is filled to a first threshold level, or that the instruction queue 148 of the tag processing hardware 140 is filled to a second threshold level. In response, the hardware interface 300 may send a STALL signal to the bus 115, which may use the STALL signal to gate a VALID signal and/or a READY signal in a handshake. This may prevent the handshake from being successful until the STALL signal is de-asserted, which may happen when the result queue 114 drops below a third threshold level (which may be lower than the first threshold level), or when the instruction queue 148 drops below a fourth threshold level (which may be lower than the second threshold level). Illustrative first, second, third, and fourth threshold levels are shown in FIG. 3B, in accordance with some embodiments.

Additionally, or alternatively, the hardware interface 300 may cause the host processor 110 to perform a memory access in response to determining that the tag processor hardware 140 is falling behind. For instance, when the result queue 114 of the write interlock 112 is filled to a fifth threshold level, or when the instruction queue 148 of the tag processing hardware 140 is filled to a sixth threshold level, the hardware interface 300 may assert an interrupt (e.g., a non-maskable interrupt, or an interrupt for which masking may only be set in a privilege mode that is higher than one or more privilege modes to be protected by the tag processing hardware 140) to cause the host processor 110 to perform a memory access at a corresponding interrupt vector address (where an interrupt handler corresponding to the interrupt may be stored). Illustrative fifth and sixth threshold levels are shown in FIG. 3B, in accordance with some embodiments.

The inventors have recognized and appreciated that some host processor designs may have one or more memory address ranges that are designated as non-cacheable. Accordingly, in some embodiments, an address from a non-cacheable range may be selected as the interrupt vector address, so that the host processor 110 may have to perform a memory access in response to the interrupt, instead of relying on a cache.

The inventors have also recognized and appreciated that some host processor designs may provide a mechanism for forcing a cache eviction based on an address. Accordingly, in some embodiments, the interrupt handler may force a cache eviction of the interrupt vector address, so that the host processor 110 may have to perform a memory access when the interrupt is asserted again in the future.

In some embodiments, the tag processing hardware 140 may check metadata associated with instructions executed by the host processor 110 after a first interrupt has been asserted to stall the host processor 110, to determine whether the metadata indicates the instructions are part of interrupt handling code. If it is determined that the host processor is not executing interrupt handling code, the tag processing hardware 140 may assert a second interrupt to cause the host processor 110 to execute code at an interrupt vector address corresponding to the second interrupt. This code may in turn cause the host processor 110 to jump to an interrupt handler for policy violation.

In some embodiments, the tag processing hardware 140 may check metadata associated with instructions executed by the host processor 110 after the second interrupt has been asserted to cause the host processor 110 to perform policy violation processing. If it is determined that the host processor is not performing policy violation processing, the tag processing hardware 140 may assert another signal to escalate the host processor 110's response. For instance, an ERROR signal may be asserted to cause the host processor 110 to halt or reset.

The inventors have recognized and appreciated that, in many host processor designs, non-maskable interrupts may be attended to quickly (e.g., even if application processor code has disabled interrupts). Therefore, asserting a non-maskable interrupt may be an effective way to stall the host processor 110. However, it should be appreciated that aspects of the present disclosure are not limited to using a non-maskable interrupt, or any interrupt at all. In some embodiments, a policy may be provided that indicates a selected interrupt may not be masked. If the host processor 110 executes an instruction that attempts to mask the selected interrupt, checking of the instruction by the tag processing hardware 140 may trigger a policy violation. For instance, a control register associated with masking of the selected interrupt may be tagged with metadata that indicates the control register may not be modified, and a policy rule may be provided that indicates an instruction attempting to modify a control register tagged with such metadata should be disallowed.

The inventors have further recognized and appreciated that asserting an interrupt to stall the host processor 110 may lead to some inefficiency. For instance, in response to the interrupt, the host processor 110 may perform a context switch, which may involve switching registers, stack pointer, program counter, address space, etc. Therefore, in some embodiments, an interrupt may be asserted only if simply starving the host processor 110 of memory access has turned out to be insufficient. For instance, with reference to the example of FIG. 3B, the fifth threshold level of the result queue 114 of the write interlock 112 (which may be used for triggering an interrupt) may be set higher than the first threshold level (which may be used for triggering simple starvation of memory access). Likewise, the sixth threshold level of the instruction queue 148 of the tag processing hardware 140 (which may be used for triggering an interrupt) may be set higher than the second threshold level (which may be used for triggering simple starvation of memory access). In this manner, inefficiency associated with an interrupt may be reduced.

Although details of implementation are shown in FIGS. 3A-3B and discussed above, it should be appreciated that aspects of the present disclosure are not limited to any particular manner of implementation. For instance, in some embodiments, a man-in-the-middle approach may be used instead of, or in addition to, gating a bus handshake. For example, a hardware component may be inserted between the host processor 110 and the bus 115. The hardware component may accept from the host processor 110 a request with an address from which an instruction or a piece of data is to be read (or to which an instruction or a piece data is to be written), but may refrain from forwarding the address to the bus 115 until the tag processing hardware 140 has caught up.

It should also be appreciated that not all components may be shown in FIGS. 3A-3B. For instance, the tag processing hardware 140 may include one or more components (e.g., the illustrative tag map table 142, rule cache 144, and/or tag register file 146 in the example of FIG. 1) in addition to, or instead of the instruction queue 148.

As discussed above, a host processor may, in some embodiments, be configured to respond to an interrupt by retrieving an interrupt handler from an interrupt vector address corresponding to the asserted interrupt. The inventors have recognized and appreciated that a policy processor may be able to influence a behavior of the host processor by storing one or more selected instructions at the interrupt vector address.

Figure 4:
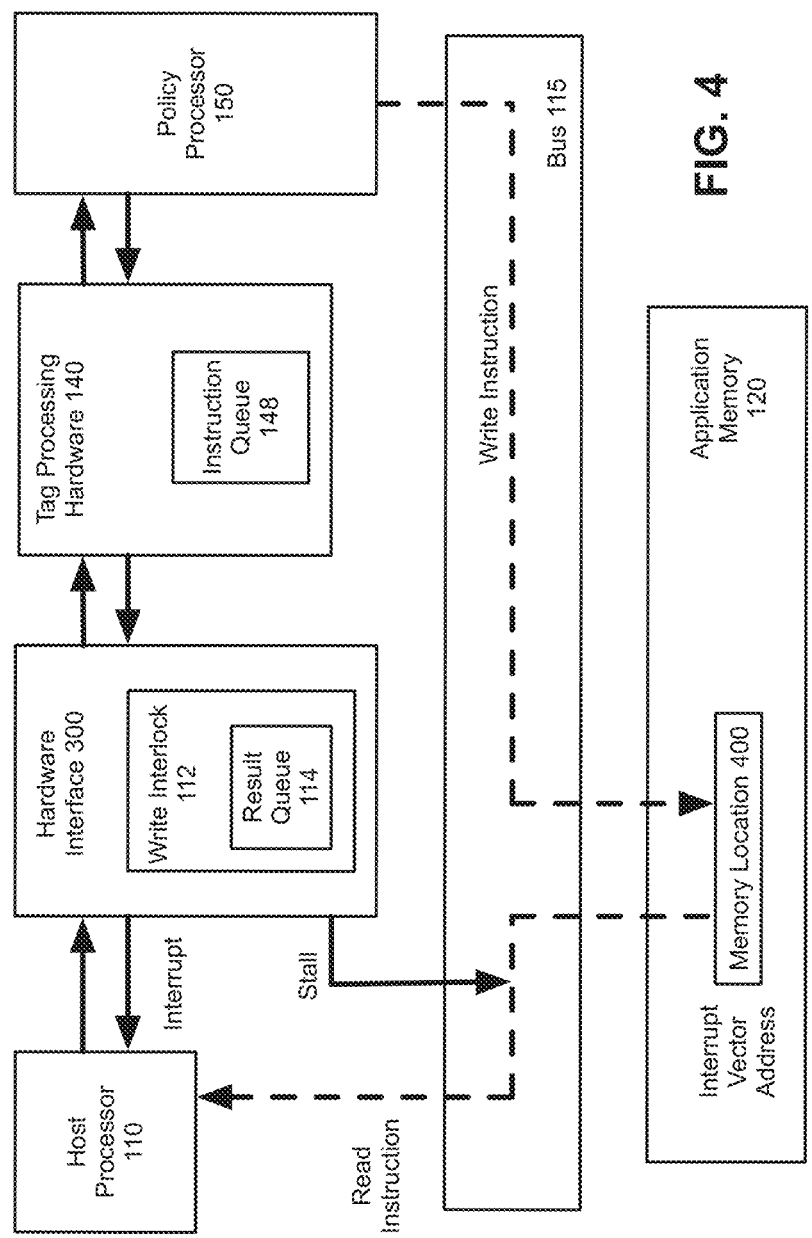
FIG. 4 shows an illustrative application memory location 400, in accordance with some embodiments.

FIG. 4 shows an illustrative application memory location 400, in accordance with some embodiments. For instance, the application memory location 400 may be at an interrupt vector address associated with an interrupt of a host processor (e.g., the illustrative host processor 110 in the example of FIG. 3A).

In some embodiments, the interrupt may be asserted in response to determining that tag processing hardware (e.g., the illustrative tag processor hardware 140 in the example of FIG. 3A) is falling behind the host processor 110. For instance, when a result queue such as the illustrative result queue 114 in the example of FIGS. 3A-3B is filled to a fifth threshold level, or when an instruction queue such as the illustrative instruction queue 148 in the example of FIGS. 3A-3B is filled to a sixth threshold level, the interrupt may be asserted to cause the host processor 110 to read from the memory location 400. This read may, in some embodiments, be stalled until the tag processing hardware 140 catches up with the host processor 110. For instance, the read may be stalled until the result queue 114 drops below a third threshold level (which may be lower than the first threshold level and the fifth threshold level), or until the instruction queue 148 drops below a fourth threshold level (which may be lower than the second threshold level and the sixth threshold level).

In some embodiments, a policy processor (e.g., the illustrative policy processor 150 in the example of FIG. 3A) may write a selected instruction into the memory location 400. For instance, if the interrupt has been asserted to stall the host processor 110, the policy processor 150 may write into the memory location 400 an instruction that, when executed by the host processor 110 after the stall has been released, causes the host processor 110 to return from the interrupt. In this manner, only one additional instruction (namely, returning from the interrupt) may be inserted into an execution of the host processor 110, which may reduce inefficiency associated with context switching (e.g., stacking of register content).

As discussed above in connection with the example of FIG. 3A, a non-cacheable address may be selected as the interrupt vector address (which may point to the memory location 400 in the example of FIG. 4). Additionally, or alternatively, a cacheable address may be used as the interrupt vector address, and a corresponding interrupt handler may force a cache eviction of the interrupt vector address. Additionally, or alternatively, a cacheable, but coherent address may be used as the interrupt vector address, so that a cache eviction may be triggered by modifying what is stored at the interrupt vector address (e.g., when the policy processor 150 writes the selected instruction into the memory location 400).

In some embodiments, after an interrupt has been asserted to stall the host processor 110, the interrupt may be asserted again for another reason. As one example, the interrupt may be asserted in response to a policy violation identified by the tag processing hardware 140 (e.g., as discussed above in connection with the example of FIG. 1). In that case, the policy processor 150 may write into the memory location 400 an instruction that, when executed by the host processor 110, causes the host processor 110 to perform policy violation processing, such as halting, resetting, logging the violation and continuing, performing an integrity check on application code and/or application data, notifying an operator, etc. The host processor 110 may read this instruction without being stalled.

As another example, the interrupt may be asserted for a reason unrelated to metadata processing. In that case, the memory location 400 may store a default instruction that, when executed by the host processor 110, causes the host processor 110 to jump to other code that checks for one or more other sources of the interrupt. The host processor 110 may read this instruction without being stalled.

Although preventing a host processor from accessing an application memory may be an effective way to stall the host processor, the inventors have recognized and appreciated that hardware logic used to implement such stalling may slow down memory access of the host processor. For instance, the inventors have recognized and appreciated that one or more multiplexers for implementing a logical AND with two inputs may cause a slowdown even when one of the two inputs is high (so that the logical AND is simply implementing an identity function on the other input). Therefore, one or more multiplexers for gating a VALID signal and/or a READY signal in a memory access handshake may cause a slowdown even when the host processor is not being stalled. Accordingly, in some embodiments, techniques are provided for stalling a host processor without gating the host processor's memory access.

Figure 5:
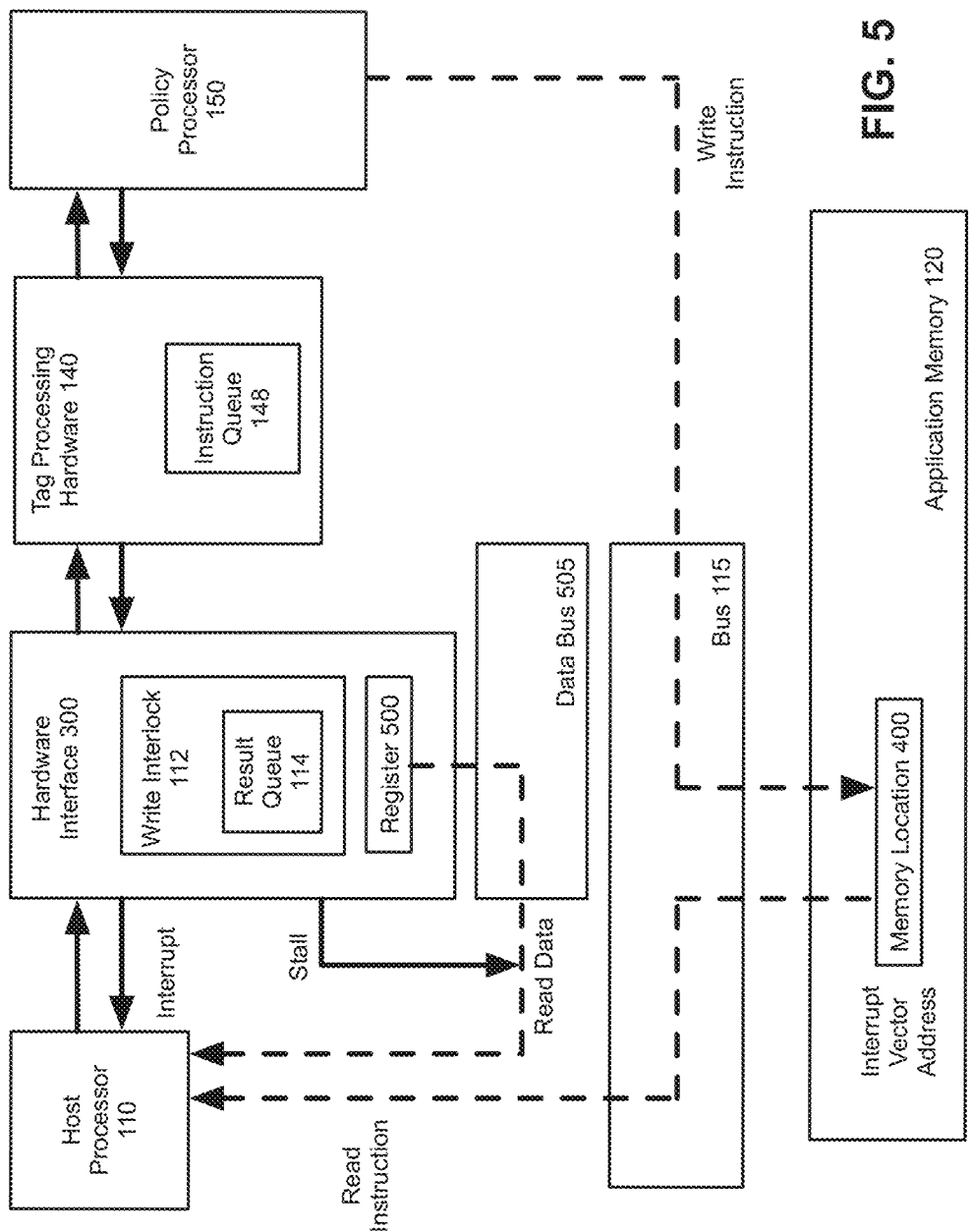
FIG. 5 shows an illustrative register 500, in accordance with some embodiments.

FIG. 5 shows an illustrative register 500, in accordance with some embodiments. The register 500 may be part of a hardware interface (e.g., the illustrative hardware interface 300 in the example of FIG. 4) between a host processor (e.g., the illustrative host processor 110 in the example of FIG. 4) and tag processing hardware (e.g., the illustrative tag processing hardware 140 in the example of FIG. 4). However, it should be appreciated that aspects of the present disclosure are not limited to any particular arrangement of components. In some embodiments, the register 500 may be provided outside the hardware interface 300.

In some embodiments, the register 500 may be accessible to the host processor 110 via a data bus 505. Additionally, or alternatively, the register 500 may be accessible to a policy processor (e.g., the illustrative policy processor 150 in the example of FIG. 4), for example, via the tag processing hardware 140.

In the example of FIG. 5, an interrupt may be asserted in response to determining that the illustrative tag processor hardware 140 is falling behind the host processor 110. For instance, when a result queue such as the illustrative result queue 114 in the example of FIGS. 3A-3B is filled to a fifth threshold level, or when an instruction queue such as the illustrative instruction queue 148 in the example of FIGS. 3A-3B is filled to a sixth threshold level, the interrupt may be asserted to cause the host processor 110 to read from the memory location 400. This read may be performed via a bus, such as the illustrative bus 115 in the example of FIG. 4. In this example, the bus 115 may be an instruction bus.

In some embodiments, the policy processor 150 may write a selected instruction into the memory location 400. For instance, the policy processor 150 may write into the memory location 400 an instruction that, when executed by the host processor 110, causes the host processor 110 to read from the register 500 via the data bus 505. If the interrupt is asserted to stall the host processor 110, this read may be stalled until the tag processing hardware 140 catches up with the host processor 110. For instance, the read may be stalled until the result queue 114 shown in FIGS. 3A-3B drops below a third threshold level (which may be lower than the first threshold level and the fifth threshold level), or until the instruction queue 148 shown in FIGS. 3A-3B drops below a fourth threshold level (which may be lower than the second threshold level and the sixth threshold level).

In some embodiments, the policy processor 150 may write a value into the register 500 that indicates a reason for asserting the interrupt. As one example, the interrupt may be asserted to stall the host processor 110. Upon reading from the register 500 a value indicative of a stall, the host processor 110 may be configured to return from the interrupt and resume execution. The inventors have recognized and appreciated that, by the time the host processor 110 is able to read from the register 500, the stall on the data bus 505 must have been released, and therefore the tag processing hardware 140 must have caught up with the host processor 110.

As another example, the interrupt may be asserted to notify the host processor 110 of a policy violation. The host processor 110 may be configured to perform policy violation processing upon reading from the register 500 a value indicative of a policy violation.

As yet another example, the interrupt may be asserted for a reason unrelated to metadata processing, and a value read from the register 500 may so indicate. The host processor 110 may be configured to check for one or more other possible sources of the interrupt, and may jump to an appropriate interrupt handler.

The inventors have recognized and appreciating that, by communicating with the host processor 110 via the register 500, stalling may be implemented without gating memory access of the host processor 110. However, more instructions may be executed by the host processor 110 in response to the interrupt, and thus more instructions may be checked by the tag processing hardware 140 and/or the policy processor 150. Moreover, the host processor 110 may use a register to form a data bus address for the register 500, so there may be some inefficiency associated with context switching (e.g., stacking of register content).

It should be appreciated that aspects of the present disclosure are not limited to any particular component or any particular arrangement of components. For instance, aspects of the present disclosure are not limited to using separate instruction and data buses such as the illustrative buses 115 and 505 in the example of FIG. 5. In some embodiments, the illustrative bus 115 may serve as both an instruction bus and a data bus.

Moreover, the inventors have recognized and appreciated that some systems have separate memory regions for instructions and data, where a slowdown of data memory access may be less detrimental to performance than a slowdown of instruction memory access. Accordingly, in some embodiments, techniques are provided for stalling a host processor by gating data memory accesses, without gating instruction memory accesses.

FIG. 6 shows an illustrative application memory location 600, in accordance with some embodiments. For instance, the memory location 600 may be in a portion of the illustrative application memory 120 in the example of FIG. 5 that may be designated for data, whereas the illustrative memory location 400 in the example of FIG. 5 may be in a portion of the illustrative application memory 120 that may be designated for instructions.

In some embodiments, the policy processor 150 may write into the memory location 400 an instruction that, when executed by the host processor 110, causes the host processor 110 to read from the data memory location 600 (instead of the illustrative register 500 in the example of FIG. 5). This read may be stalled until the tag processing hardware 140 is ready to accept more executed instructions from the host processor 110. The data memory location 600 may store a value indicating a reason for asserting an interrupt, for example, as discussed above in connection with the example of FIG. 5.

It should be appreciated that aspects of the present disclosure are not limited to asserting an interrupt to cause the host processor 100 to perform a load operation. In some embodiments, the policy processor 150 may write into the memory location 400 an instruction that, when executed by the host processor 110, causes the host processor 110 to store a value into the illustrative register 500 shown in FIG. 5 or the data memory location 600 shown in FIG. 6. An address of the register 500 or the data memory location 600 may be non-cacheable, so that the store operation may be stalled by the illustrative write interlock 112 until the store operation is checked by the tag processing hardware 140 and/or the policy processor 150.

It should also be appreciated that aspects of the present disclosure are not limited to the policy processor 150 writing an instruction into the memory location 400. In some embodiments, an instruction may be written into the memory location by the interface hardware 300 and/or the tag processing hardware 140, in addition to, or instead of, the policy processor 150. Additionally, or alternatively, an instruction in the memory location 400 may be static. For instance, the memory location 400 may be initialized with an instruction that, when executed by the host processor 110, causes the host processor 110 to read from the data memory location 600 in the example of FIG. 6 or the register 500 in the example of FIG. 5. This instruction may remain in the memory location 400.

It should also be appreciated that the illustrative techniques described herein may be used in any suitable combination. For instance, in some embodiments, all transactions (e.g., both load and store) on all buses (e.g., data and instruction buses) may be stalled in response to determining that the illustrative result queue 114 is filled to a first threshold level, or that the illustrative instruction queue 148 is filled to a second threshold level, for example, as discussed in connection with FIGS. 3A-3B. If the result queue 114 continues to fill to a fifth threshold level, or if the instruction queue 148 continues to fill to a sixth threshold level, an interrupt may be asserted to cause the illustrative host processor 110 to perform a memory access at a corresponding interrupt vector address (where an interrupt handler corresponding to the interrupt may be stored). This memory access may be stalled, since all bus transactions are stalled.

In some embodiments, the illustrative tag processing hardware 140 may catch up while the host processor 110 is stalled. For instance, the result queue 114 may drop below a third threshold level (which may be lower than the first threshold level), or when the instruction queue 148 drops below a fourth threshold level (which may be lower than the second threshold level), for example, as discussed in connection with FIGS. 3A-3B. As a result, all bus transactions may be allowed to proceed, including the instruction fetch at the interrupt vector address. The corresponding interrupt handler may cause the host processor 110 to check a status register controlled by the illustrative policy processor 150, for example, as discussed in connection with FIG. 5. Additionally, or alternatively, the interrupt handler may cause the host processor 110 to check one or more other status registers, which may be controlled by one or more other hardware components that may also cause an interrupt. The one or more other status registers may be checked before or after the status register controlled by the policy processor 150. If no status register is found that indicates a pending interrupt, the host processor 110 may resume normal operation.

In some embodiments, if the status register controlled by the policy processor 150 indicates the interrupt was asserted to stall the host processor 110, the host processor 110 may resume normal operation without checking any other status register. Before allowing the host processor 110 to resume, the interrupt handler may invalidate a cache line holding an entry instruction of the interrupt handler. If an interrupt has been asserted for a reason other than stalling, the host processor 110 may, upon returning from the interrupt handler, determine that an interrupt signal is still high. In response, the host processor 110 may attempt to perform an instruction fetch at the interrupt vector address. Because the cache line holding the entry instruction of the interrupt handler has been invalidated, an instruction may be loaded from the memory location 400. This instruction, when executed by the host processor 110, may cause the host processor 110 to check one or more other status registers controlled by one or more hardware components other than the policy processor 150.

It should be appreciated that aspects of the present disclosure are not limited to causing a host processor to perform a bus transaction in response to detecting that tag processor hardware is falling behind. In some embodiments, a host processor may be caused to perform bus transactions on a regular basis. For instance, a compiler may be provided to insert load operations into object code (e.g., inserting a load operation every N instructions, for some suitable N), where the load operations may attempt to access a non-cacheable address. One or more such load operations may be stalled, for example, using one or more of the techniques described in connection with FIGS. 4-6. In this manner, inefficiency associated with context switching may be reduced, while providing regular opportunities for stalling the host processor as appropriate.

The inventors have recognized and appreciated that an interrupt-based approach may cause a large performance penalty (e.g., due to inefficiency associated with context switching), but only occasionally, whereas an approach based on code injection may cause a modest performance penalty on a regular basis. Accordingly, in some embodiments, testing may be performed using software that is expected to be deployed. For instance, one or more test runs may be conducted without code injection. If an interrupt for stalling is observed frequently, code injection may be used to reduce occurrences of such an interrupt. For example, multiple test runs may be conducted by inserting a load operation every N instructions for different values of N, and a suitable N may be chosen that achieves a desired performance profile.

In some embodiments, a value of N may be chosen based on a capacity of a downstream component, such as a threshold level of the illustrative result queue 114 or the illustrative instruction queue 148 in the example of FIGS. 3A-3B. For instance, the value of N may be chosen so that it is unlikely the queue will fill up to the threshold level.

In some embodiments, instead of a fixed value of N, load operations may be inserted at randomly selected intervals. A suitable probability distribution may be used, such as a Gaussian distribution with suitable mean and standard deviation. For instance, the mean and/or the standard deviation may be selected based on a capacity of a downstream component (e.g., a threshold level of the illustrative result queue 114 or the illustrative instruction queue 148 in the example of FIGS. 3A-3B), so that the capacity of the downstream component is unlikely to be exceeded (e.g., less than some threshold probability).

In some embodiments, a size of a queue in a downstream component (e.g., the illustrative result queue 114 or the illustrative instruction queue 148 in the example of FIGS. 3A-3B) may be chosen to allow the queue to hold a number of results that may be generated, or instructions that may be executed, in a single quantum of a pre-emptive operating system. An operating system task switcher may be provided that checks, between consecutive quanta, whether the queue has been sufficiently emptied to hold another quantum. If the queue has not been sufficiently emptied, the task switcher may apply one or more of the illustrative techniques described herein for stalling a host processor.

It should be appreciated that aspects of the present disclosure are not limited to stalling a host processor by preventing the host processor from performing a load operation. In some embodiments, a host processor may be stalled using a hardware breakpoint, for example, by issuing a command over a Joint Test Action Group (JTAG) bus to set a breakpoint address.

It should also be appreciated that one or more of the stalling techniques described herein may be used for purposes other than metadata processing. For instance, the inventors have recognized and appreciated that some trace interfaces are designed to capture a small portion of an execution trace for analysis (e.g., M instructions following a trigger, for some suitable M). Such a trace interface may not be suitable for sustained monitoring of a host processor. Accordingly, in some embodiments, one or more of the stalling techniques described herein may be used to stall a host processor during trace debugging.

Illustrative configurations of various aspects of the present disclosure are provided below.

A1. A method for stalling a host processor, the method comprising acts of:
  causing the host processor to initiate one or more selected transactions, wherein the one or more selected transactions comprise a bus transaction; and
  preventing the host processor from completing the one or more selected transactions, to thereby stall the host processor.

A2. The method of configuration A1, wherein:
the host processor communicates with a downstream component via a communication path;

the bus transaction is initiated on a bus that is outside the communication path between the host processor and the downstream component; and the act of preventing the host processor from completing the one or more selected transactions is performed in response to determining that the downstream component is falling behind the host processor.

A3. The method of configuration A1, wherein:
the bus transaction is selected from a group consisting of: an instruction bus transaction and a data bus transaction.

A4. The method of configuration A2, wherein:
the bus transaction is selected from a group consisting of: a load operation and a store operation.

A5. The method of configuration A1, wherein:
the act of causing the host processor to initiate one or more selected transactions comprises asserting an interrupt to cause the host processor to initiate the bus transaction, which comprises an operation with respect to a selected address.

A6. The method of configuration A5, wherein:
the interrupt comprises a non-maskable interrupt.

A7. The method of configuration A5, wherein:
the selected address comprises an interrupt vector address corresponding to the interrupt; and
the act of preventing the host processor from completing the bus transaction comprises preventing the host processor from loading, from the interrupt vector address, one or more instructions of an interrupt handler corresponding to the interrupt.

A8. The method of configuration A7, further comprising an act of:
storing, at the interrupt vector address, one or more instructions that, when executed by the host processor, cause the host processor to return from the interrupt.

A9. The method of configuration A7, further comprising an act of:
storing, at the interrupt vector address, one or more instructions that, when executed by the host processor, cause the host processor to check for a cause of the interrupt.

A10. The method of configuration A7, wherein:
the interrupt comprises a first interrupt; and
the method further comprises acts of:
determining whether a second interrupt has been asserted after the first interrupt; and
in response to determining that a second interrupt has been asserted after the first interrupt, storing, at the interrupt vector address, one or more instructions that, when executed by the host processor, cause the host processor to jump to an interrupt handler corresponding to the second interrupt.

A11. The method of configuration A5, wherein:
the selected address comprises an address of a selected register; and
the act of preventing the host processor from completing the bus transaction comprises preventing the host processor from accessing the selected register.

A12. The method of configuration A11, wherein:
the act of preventing the host processor from completing the bus transaction comprises preventing the host processor from storing a value to the selected register.

A13. The method of configuration A11, wherein:
the act of preventing the host processor from completing the bus transaction comprises preventing the host processor from loading a value stored in the selected register.

A14. The method of configuration A13, further comprising an act of:
storing the value in the selected register, wherein the value is indicative of a cause of the interrupt.

A15. The method of configuration A11, further comprising an act of:
storing, at an interrupt vector address corresponding to the interrupt, one or more instructions that, when executed by the host processor, cause the host processor to access the selected register.

A16. The method of configuration A1, further comprising an act of:
detecting a trigger to stall the host processor, wherein the act of causing the host processor to initiate one or more selected transactions is performed in response to detecting the trigger to stall the host processor.

A17. The method of configuration A16, further comprising an act of:
processing metadata associated with instructions executed by the host processor to check if the instructions are to be allowed, wherein the act of detecting a trigger to stall the host processor comprises determining that the metadata processing is falling behind the host processor's execution.

A18. The method of configuration A17, further comprising acts of:
storing a result of the host processor's execution in a result queue while an instruction that produced the result is being checked; and
in response to determining that the instruction is to be allowed, writing the result to an application memory, wherein the act of detecting a trigger to stall the host processor comprises determining that the result queue is filled to a selected threshold level.

A19. The method of configuration A17, further comprising an act of:
storing instructions to be checked in an instruction queue, wherein the act of detecting a trigger to stall the host processor comprises determining that the instruction queue is filled to a selected threshold level.

A20. The method of configuration A17, further comprising an act of:
allowing the host processor to complete the one or more selected transactions in response to determining that the metadata processing is no longer behind the host processor's execution.

A21. The method of configuration A1, wherein:
the act of causing the host processor to initiate one or more selected transactions comprises inserting, into object code, one or more instructions that, when executed by the host processor, cause the host processor to initiate the one or more selected transactions.

A22. The method of configuration A21, wherein:
the one or more instructions are inserted into the object code at a frequency selected based on a capacity of a downstream component that consumes outputs of the host processor.

A23. The method of configuration A22, wherein:
the capacity of the downstream component is selected based on a quantum of a pre-emptive operating system.

A24. The method of configuration A22, wherein:
the frequency is selected according to a probability distribution.

B1. A method for stalling transactions on a first bus along a communication path between an upstream component and a downstream component, the method comprising acts of:

causing the upstream component to initiate a transaction on a second bus, wherein the second bus is outside the communication path between the upstream component and the downstream component; and stalling the transaction on the second bus to thereby stall the upstream component.

B2. The method of configuration B1, wherein:
the first bus does not provide a native stall signal.

B3. The method of configuration B2, wherein:
the act of causing the upstream component to initiate a transaction on a second bus is performed in response to detecting that the downstream component is falling behind the upstream component.

C1. A system comprising circuitry and/or one or more processors programmed by executable instructions, wherein the circuitry and/or the one or more programmed processors are configured to perform the method of any of configurations A1-A24 and B1-B3.

D1. At least one computer-readable medium having stored thereon at least one netlist for the circuitry of configuration C1.

D2. At least one computer-readable medium having stored thereon at least one hardware description that, when synthesized, produces the at least one netlist of configuration D1.

D3. The at least one computer-readable medium of configuration D2, wherein the at least one hardware description is in an encrypted form.

D4. At least one computer-readable medium having stored thereon the executable instructions of configuration C1.

Figure 7:
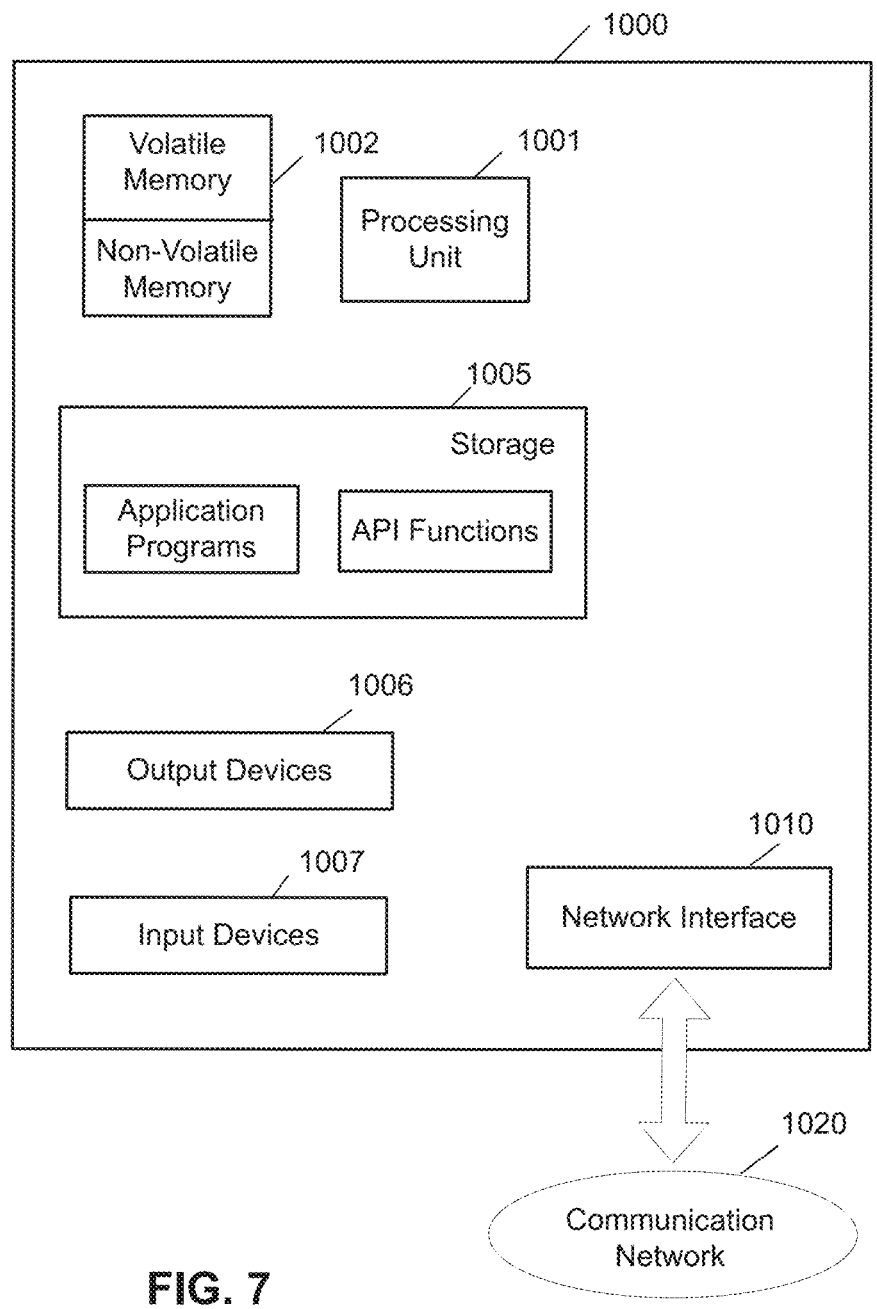
FIG. 7 shows, schematically, an illustrative computer 1000 on which any aspect of the present disclosure may be implemented.

FIG. 7 shows, schematically, an illustrative computer 71000 on which any aspect of the present disclosure may be implemented.

In the embodiment shown in FIG. 7, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 7. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 7, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method for stalling transactions on a first bus, the method comprising acts of:
   causing an upstream component to initiate a transaction on a second bus, wherein:
     the first bus is along a communication path between the upstream component and a downstream component;
     the first bus does not provide a native stall signal;
     the second bus is outside the communication path between the upstream component and the downstream component; and
     the act of causing the upstream component to initiate the transaction on the second bus comprises asserting an interrupt to cause the upstream component to initiate the transaction on the second bus; and
     the transaction on the second bus comprises an operation with respect to a selected address; and
   stalling the transaction on the second bus to thereby stall the upstream component.

2. The method of claim 1, wherein:
   the selected address comprises an interrupt vector address corresponding to the interrupt; and
   the act of stalling the transaction on the second bus comprises preventing the upstream component from loading, from the interrupt vector address, one or more instructions of an interrupt handler corresponding to the interrupt.

3. The method of claim 1, wherein:
   the selected address comprises an address of a selected register; and
   the act of stalling the transaction on the second bus comprises preventing the upstream component from accessing the selected register.

4. The method of claim 1, wherein:
   the upstream component comprises a host processor; and
   the method further comprises an act of:
     processing metadata associated with instructions executed by the host processor to check if the instructions are to be allowed, wherein the act of causing the upstream component to initiate the transaction on the second bus is performed in response to determining that the metadata processing is falling behind the host processor's execution.

5. The method of claim 4, further comprising acts of:
   storing a result of the host processor's execution in a result queue while an instruction that produced the result is being checked; and
   in response to determining that the instruction is to be allowed, writing the result to an application memory, wherein the act of causing the upstream component to initiate the transaction on the second bus is performed in response to determining that the result queue is filled to a selected threshold level.

6. The method of claim 4, further comprising an act of:
   storing instructions to be checked in an instruction queue, wherein the act of causing the upstream component to initiate the transaction on the second bus is performed in response to determining that the instruction queue is filled to a selected threshold level.

7. The method of claim 1, wherein:
   the act of causing the upstream component to initiate the transaction on the second bus is performed as a result of the upstream component executing one or more selected instructions; and
   the one or more selected instructions are present in object code at a frequency selected based on a capacity of the downstream component that consumes outputs of the upstream component.

8. The method of claim 7, wherein:
   the capacity of the downstream component is selected based on a quantum of a pre-emptive operating system.

9. The method of claim 1, wherein:
   the act of causing the upstream component to initiate the transaction on the second bus is performed in response to detecting that the downstream component is falling behind the upstream component.

10. A system comprising circuitry and/or one or more processors programmed by executable instructions, wherein the circuitry and/or the one or more programmed processors are configured to;
   cause an upstream component to initiate a transaction on a second bus, wherein:
     a first bus is along a communication path between the upstream component and a downstream component;
     the first bus does not provide a native stall signal;
     the second bus is outside the communication path between the upstream component and the downstream component;
     the circuitry and/or the one or more programmed processors are configured to cause the upstream component to initiate the transaction on the second bus at least in part by asserting an interrupt to cause the upstream component to initiate the transaction on the second bus; and the transaction on the second bus comprises an operation with respect to a selected address; and stall the transaction on the second bus to thereby stall the upstream component.

11. The system of claim 10, wherein:

the circuitry and/or the one or more programmed processors are configured to cause the upstream component to initiate the transaction on the second bus in response to detecting that the downstream component is falling behind the upstream component.

12. The system of claim 10, wherein:

the selected address comprises an interrupt vector address corresponding to the interrupt; and the circuitry and/or the one or more programmed processors are configured to stall the transaction on the second bus at least in part by preventing the upstream component from loading, from the interrupt vector address, one or more instructions of an interrupt handler corresponding to the interrupt.

13. The system of claim 10, wherein:

the selected address comprises an address of a selected register; and the circuitry and/or the one or more programmed processors are configured to stall the transaction on the second bus at least in part by preventing the upstream component from accessing the selected register.

14. The system of claim 10, wherein:

the upstream component comprises a host processor;

the circuitry and/or the one or more programmed processors are further configured to process metadata associated with instructions executed by the host processor to check if the instructions are to be allowed; and the circuitry and/or the one or more programmed processors are further configured to cause the upstream component to initiate the transaction on the second bus in response to determining that the metadata processing is falling behind the host processor's execution.

15. The system of claim 14, wherein the circuitry and/or the one or more programmed processors are further configured to:

store a result of the host processor's execution in a result queue while an instruction that produced the result is being checked; and in response to determining that the instruction is to be allowed, write the result to an application memory, wherein the circuitry and/or the one or more programmed processors are configured to cause the upstream component to initiate the transaction on the second bus in response to determining that the result queue is filled to a selected threshold level.

16. The system of claim 14, wherein the circuitry and/or the one or more programmed processors are further configured to:

store instructions to be checked in an instruction queue, wherein the circuitry and/or the one or more programmed processors are configured to cause the upstream component to initiate the transaction on the second bus in response to determining that the instruction queue is filled to a selected threshold level.

17. The system of claim 10, wherein:

the circuitry and/or the one or more programmed processors are configured to cause the upstream component to initiate the transaction on the second bus as a result of the upstream component executing one or more selected instructions; and the one or more selected instructions are present in object code at a frequency selected based on a capacity of the downstream component that consumes outputs of the upstream component.

18. The system of claim 17, wherein:

the capacity of the downstream component is selected based on a quantum of a pre-emptive operating system.

19. At least one non-transitory computer-readable medium having stored thereon at least one hardware description for circuitry, and/or executable instructions for programming one or more processors, wherein the circuitry and/or the one or more programmed processors are configured to perform a method for stalling transactions on a first bus, the method comprising acts of:

causing an upstream component to initiate a transaction on a second bus, wherein:

the first bus is along a communication path between the upstream component and a downstream component;

the first bus does not provide a native stall signal;

the second bus is outside the communication path between the upstream component and the downstream component;

the act of causing the upstream component to initiate the transaction on the second bus comprises asserting an interrupt to cause the upstream component to initiate the transaction on the second bus; and the transaction on the second bus comprises an operation with respect to a selected address; and stalling the transaction on the second bus to thereby stall the upstream component.

20. The at least one non-transitory computer-readable medium of claim 19, wherein the at least one hardware description is in an encrypted form.

* * * * *